United States Patent
Marvie et al.

(10) Patent No.: US 9,406,165 B2
(45) Date of Patent: Aug. 2, 2016

(54) METHOD FOR ESTIMATION OF OCCLUSION IN A VIRTUAL ENVIRONMENT

(75) Inventors: Jean-Eudes Marvie, Betton (FR); Pascal Gautron, Rennes (FR); Patrice Hirtzlin, Betton (FR); Gael Sourimant, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 176 days.

(21) Appl. No.: 13/985,077

(22) PCT Filed: Feb. 3, 2012

(86) PCT No.: PCT/EP2012/051903
§ 371 (c)(1),
(2), (4) Date: Aug. 13, 2013

(87) PCT Pub. No.: WO2012/110336
PCT Pub. Date: Aug. 23, 2012

(65) Prior Publication Data
US 2013/0321416 A1    Dec. 5, 2013

(30) Foreign Application Priority Data
Feb. 18, 2011 (FR) ..................................... 11 51329

(51) Int. Cl.
G06T 15/40    (2011.01)
G06T 1/60    (2006.01)
G09G 5/393    (2006.01)

(52) U.S. Cl.
CPC ................. *G06T 15/405* (2013.01); *G06T 1/60* (2013.01); *G09G 5/393* (2013.01)

(58) Field of Classification Search
None
See application file for complete search history.

(56) References Cited

U.S. PATENT DOCUMENTS 7,375,727 B1    5/2008    Greene et al.
7,450,123 B1 *  11/2008    Kilgard .......................... 345/426

(Continued)

FOREIGN PATENT DOCUMENTS

CN    1559054    12/2004
CN    101201932    6/2008

(Continued)

OTHER PUBLICATIONS

Kellog S. Booth, David R. Forsey, and Alan W. Paeth, "Hardware Assistance for Z-Buffer Visible Surface Algorithms", Nov. 1986, IEEE, Computer Graphics and Applications, vol. 6, Issue 11, pp. 31-39.*

(Continued)

*Primary Examiner* — Robert Bader
(74) *Attorney, Agent, or Firm* — Tutunjian & Bitetto, P.C.

(57) ABSTRACT

A method for estimating occlusion in a virtual environment comprising at least two objects and observed from a viewpoint. Thereafter, a second item of information representative of the distance separating a second fragment of a second object from the viewpoint according to an observation direction is computed; the second item of information is compared with a first item of information representative of the distance separating a first fragment of a first object from the viewpoint according to the observation direction and is stored in a first buffer memory. If the second item of information is less than the first item of information, then a third item of information representative of attributes associated with the second fragment is estimated, the second item of information is stored in a second buffer memory and the third item of information is stored in a third buffer memory. If the second item of information is greater than the first item of information, of then the first item of information is stored in the second buffer memory.

19 Claims, 9 Drawing Sheets

(56) References Cited

U.S. PATENT DOCUMENTS

Figure 1:
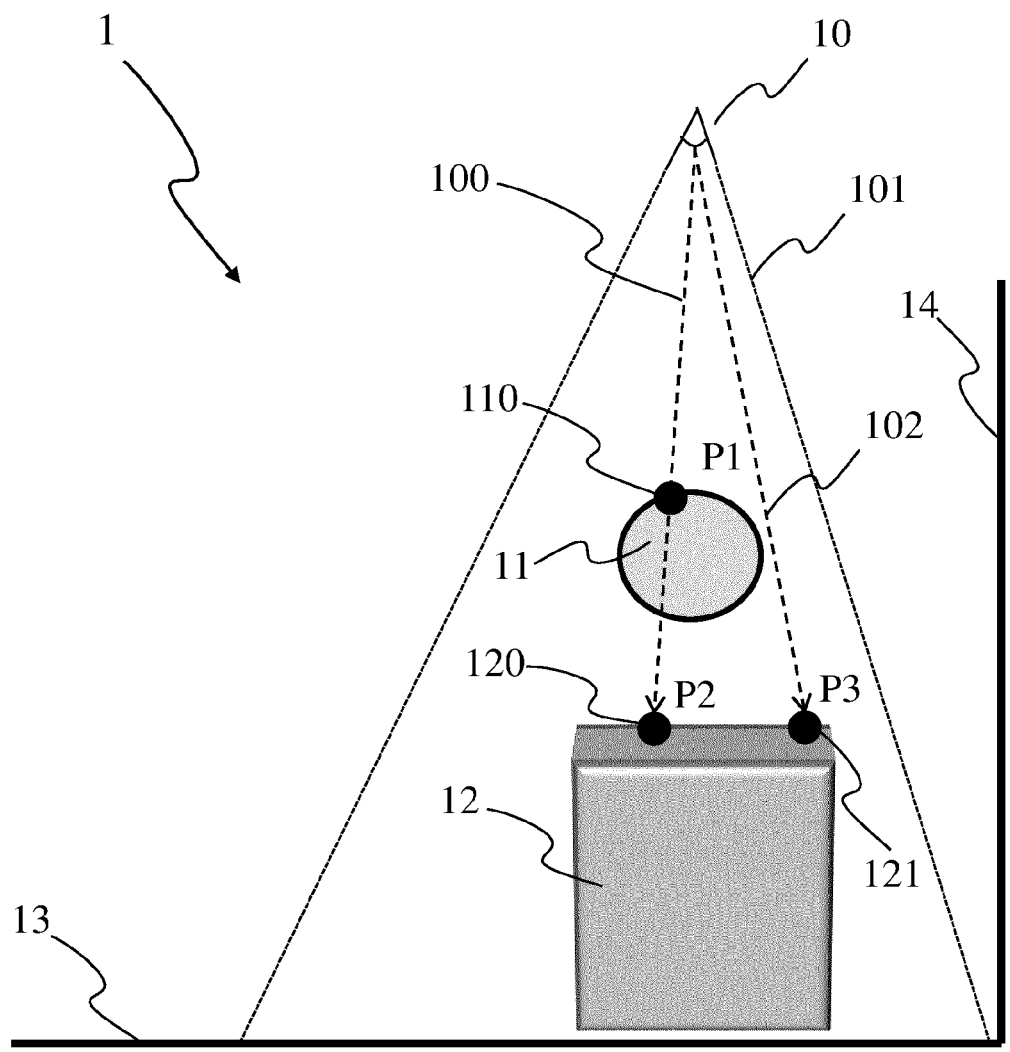

| | | |
|---|---|---|
| 7,812,837 B2 | 10/2010 | Naoi |
| 2003/0002729 A1* | 1/2003 | Wittenbrink .................. 382/154 |
| 2003/0080958 A1 | 5/2003 | Matsumoto et al. |
| 2004/0212614 A1 | 10/2004 | Aila et al. |
| 2006/0209065 A1 | 9/2006 | Lapidous et al. |
| 2009/0091577 A1 | 4/2009 | Brothers |
| 2009/0153557 A1 | 6/2009 | Dimitrov et al. |
| 2010/0007662 A1 | 1/2010 | Cox et al. |
| 2010/0302246 A1 | 12/2010 | Jiao et al. |
| 2011/0080464 A1 | 4/2011 | Alessandrini et al. |

FOREIGN PATENT DOCUMENTS

| | | |
|---|---|---|
| CN | 101312540 | 11/2008 |
| CN | 101639929 | 2/2010 |
| EP | 2249312 | 11/2010 |
| GB | 24604752 | 12/2009 |
| JP | H3286271 | 12/1992 |
| JP | 2007200251 | 8/2007 |
| WO | WO2010007285 | 1/2010 |
| WO | WO2010138870 | 12/2010 |

OTHER PUBLICATIONS

Anonymous "Z-Buffering", Wikipedia, The Free Encyclopedia, Nov. 2, 2010.

Sekuli, Dean : "Chapter 29: Efficient Occlusion Culling", GPU GEMS. Dec. 31, 2007, pp. 1-14.

Marvie, J-E, et al : "Triple Depth Culling", Aug. 11, 2011, pp. 1-1.

French Search Report Dated Sep. 28, 2011 and International Search Report Dated Mar. 12, 2012.

Decoret, X. "N-Buffers for efficient depth map query," Eurographics 2005 / M. Alexa and J. Marks, vol. 24 (2005), No. 3. Mar. 2005. pp. 1-8.

Xiong, H. et al., "Predictive Occlusion Culling for Interactive Rendering of Large Complex Virtual Scene," VSMM 2006, LNCS 4270, Oct. 2006. pp. 93-102.

\* cited by examiner

METHOD FOR ESTIMATION OF OCCLUSION IN A VIRTUAL ENVIRONMENT

This application claims the benefit, under 35 U.S.C. §365 of International Application PCT/EP2012/051903, filed Feb. 3, 2012, which was published in accordance with PCT Article 21(2) on Aug. 23, 2012 in English and which claims the benefit of French patent application No. 1151329 filed Feb. 18, 2011.

1. DOMAIN OF THE INVENTION

The invention relates to the domain of synthesis image composition and more specifically to the domain of estimation of the occlusion in a virtual environment. The invention is also understood in the context of special effects for a live composition.

2. PRIOR ART

According to the prior art, it is known to use the method known as the z-buffer algorithm in order to manage the problem of visibility in a virtual environment or 3D scene (that is to say a scene in 3 dimensions). Managing the visibility of a virtual environment consists in determining which objects or object parts of the environment are visible from a viewpoint and which objects or object parts are not visible, only the visible objects or object parts being displayed. According to this technique, the z-buffer is initialised with for example the maximal depth of each pixel of the virtual environment. Then, each object of the virtual environment is displayed, that is to say the attributes (for example colour) associated with the surface fragments forming the object are calculated, and the depth associated with each fragment of the object considered is estimated then compared to the depth value of the corresponding pixel in the z-buffer. If the depth associated with the fragment of the object is less than the depth stored in the z-buffer for the associated pixel, then the depth associated with the fragment is stored in place of the initial depth in the z-buffer, and likewise for each pixel of the z-buffer. This process is reiterated for each object of the virtual environment, the z-buffer comprising at the end of the process the depths associated with the fragments of objects of the virtual environment closest to the viewpoint, that is to say the fragments that are visible from the viewpoint. The attributes of these visible fragments are then associated with each pixel of the image in order to render the final display of the image of the virtual environment from the viewpoint. One of the problems of this technique is that it requires the calculation of attributes of all of the fragments of the surface of each object while only one part of these fragments is visible from the viewpoint. Only some of the calculated attributes actually serves therefore in the final display of the image representing the virtual environment from the viewpoint.

Some advanced techniques exist for resolution of the visibility in a virtual environment, these techniques seeking to determine which zones of the virtual environment are visible from another zone, only the objects or object parts visible in the zone containing the viewpoint being displayed. These techniques enable the calculations to be reduced but require a prior processing of the virtual environment, which renders it unsuited to dynamic environments requiring the live resolution of visibility problems.

With the emergence of interactive simulation games and applications, notably in three dimensions (3D), the need is being felt for live simulation methods offering an estimation of the visibility, that is to say a high quality and realistic, rapid occlusion estimation.

3. SUMMARY OF THE INVENTION

The purpose of the invention is to overcome at least one of these disadvantages of the prior art.

More specifically, the purpose of the invention is notably to optimize the calculation time and/or the calculation power required to estimate live the occlusion in a virtual environment to produce a realistic display.

The invention relates to a method for estimation of the occlusion in a virtual environment comprising at least two objects, the virtual environment being observed from a viewpoint, the method comprising steps for:
  estimating a second item of information representative of the distance separating a second fragment of a second object from the viewpoint according to an observation direction,
  comparing the second item of information with a first item of information representative of the distance separating a first fragment of a first object from the viewpoint according to said observation direction and stored in a first buffer memory:
    estimation of a third item of information representative of attributes associated with the second fragment if and only if the second item of information is less than the first item of information, storage of the second item of information in a second buffer memory and storage of the third item of information in a third buffer memory,
    if the second item of information is greater than the first item of information, storage of the first item of information in the second buffer memory.
  the first buffer memory (21, 61) and the second buffer memory (22, 62) being used alternately in a way to be able to read access in one of the first and second buffer memories while having write access in the other first and second buffer memories.

According to a particular characteristic, the first, second and third buffer memories are graphic processor display buffer memory type memories.

Advantageously, the item of information having the smallest value among the first item of information and the second item of information is stored in a fourth buffer memory.

According to a specific characteristic, the third item of information is stored temporarily in the second buffer memory before being copied into the third buffer memory.

Advantageously, the third item of information is stored temporarily in the second buffer memory before being copied into the third buffer memory.

According to a particular characteristic, when the second item of information is greater than the first item of information, a fourth item of information representative of attributes associated with the first fragment is stored in the third buffer memory.

According to another characteristic, the fourth item of information is stored temporarily in the first buffer memory before being copied into the third buffer memory.

Advantageously, the steps of estimation, of comparison and of storage are reiterated for each second fragment of the second object.

According to a specific characteristic, the method comprises a step of classification of at least two objects of the virtual environment according to their respective distances to the viewpoint closest to the viewpoint to the viewpoint farthest from the viewpoint, the first object being closer to the viewpoint than the second object.

According to another characteristic, the method comprises a step of initialization of the first buffer memory with information representative of the distance separating each fragment of the first object from the viewpoint.

The invention also relates to a module for generation of an image representative of a virtual environment comprising at least two objects, the virtual environment being observed from a viewpoint, the module comprising:

estimation means for estimating a second item of information representative of the distance separating a second fragment of a second object from the viewpoint according to an observation direction, comparison means for comparing the second item of information with a first item of information representative of the distance separating a first fragment of a first object from the viewpoint according to the observation direction and stored in a first buffer memory:

a third item of information representative of attributes associated with the second fragment being estimated if and only if the second item of information is less than the first item of information, the second item of information being stored in a second buffer memory and the third item of information being stored in a third buffer memory, the first item of information being stored in the second buffer memory if the second item of information is greater than the first item of information, the first buffer memory and the second buffer memory being used alternately in a way to be able to read access in one of the first and second buffer memories while having write access in the other first and second buffer memories.

Advantageously, the second and third buffer memories are graphic processor display buffer memory type memories.

According to a particular characteristic, the module comprises a fourth buffer memory to store the item of information having the smallest value from among the first item of information and the second item of information.

The invention also relates to a graphical processor comprising such a module.

4. LIST OF FIGURES

Figure 2:
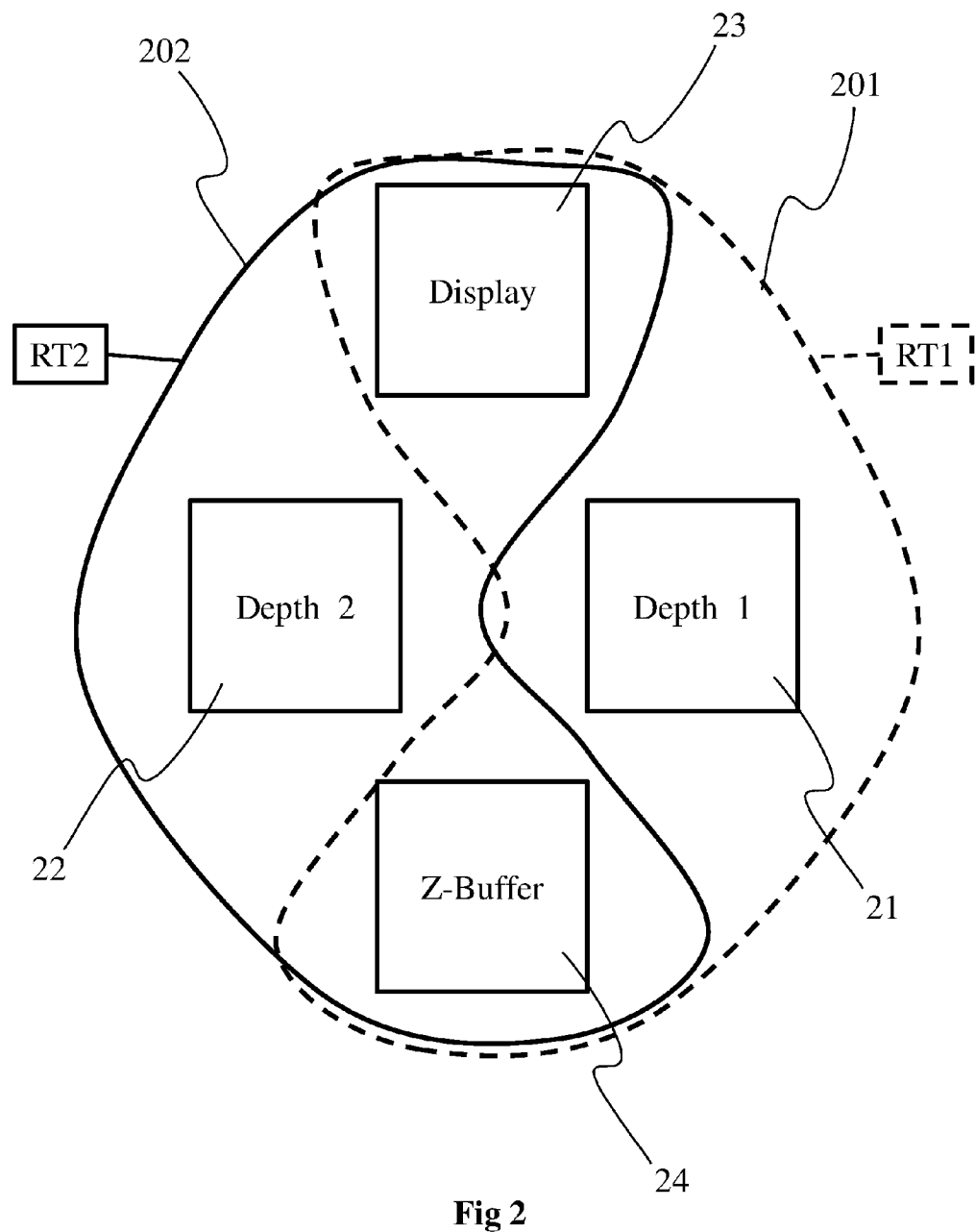
Figure 3:
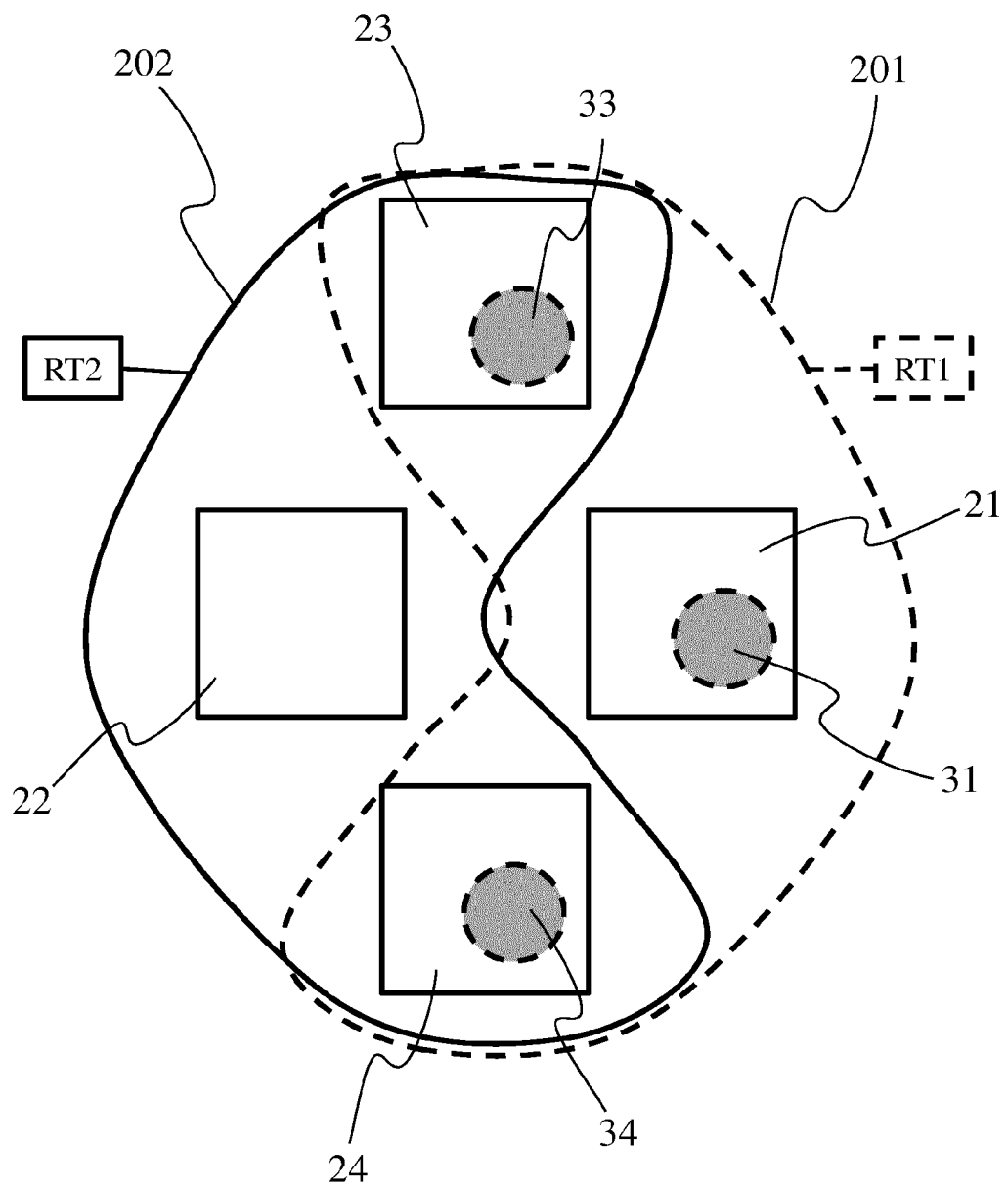
Figure 4:
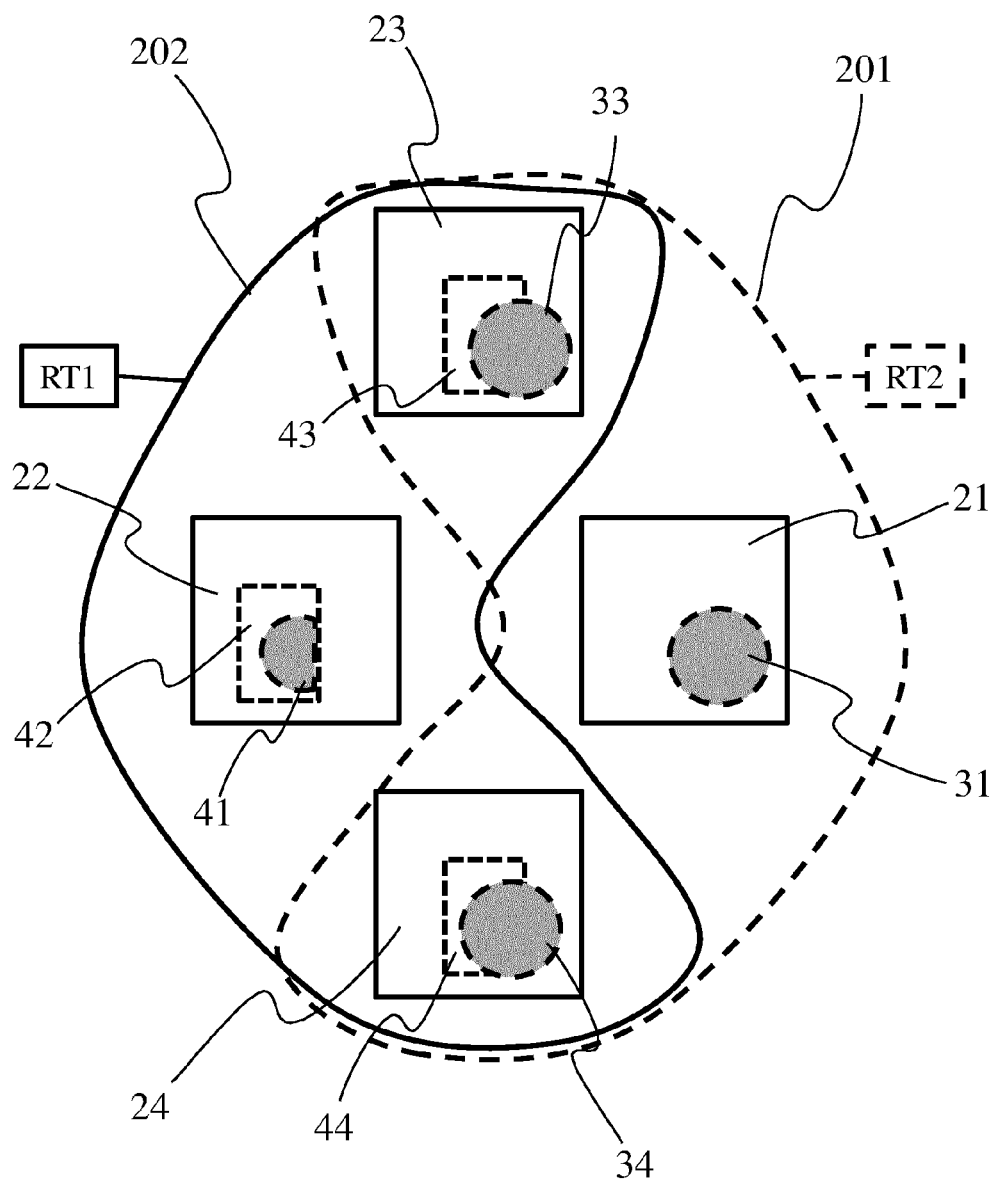
Figure 5:
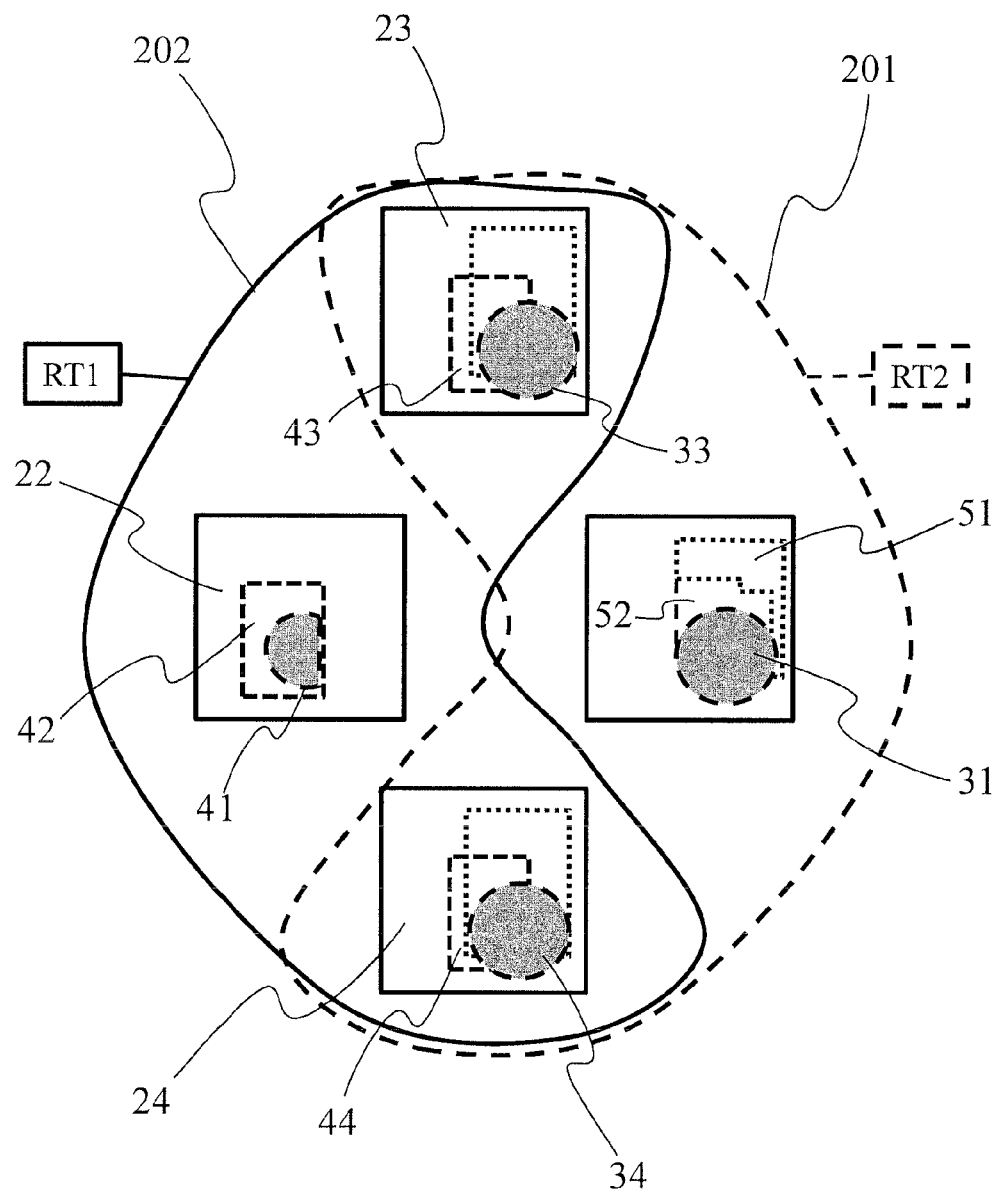
Figure 6:
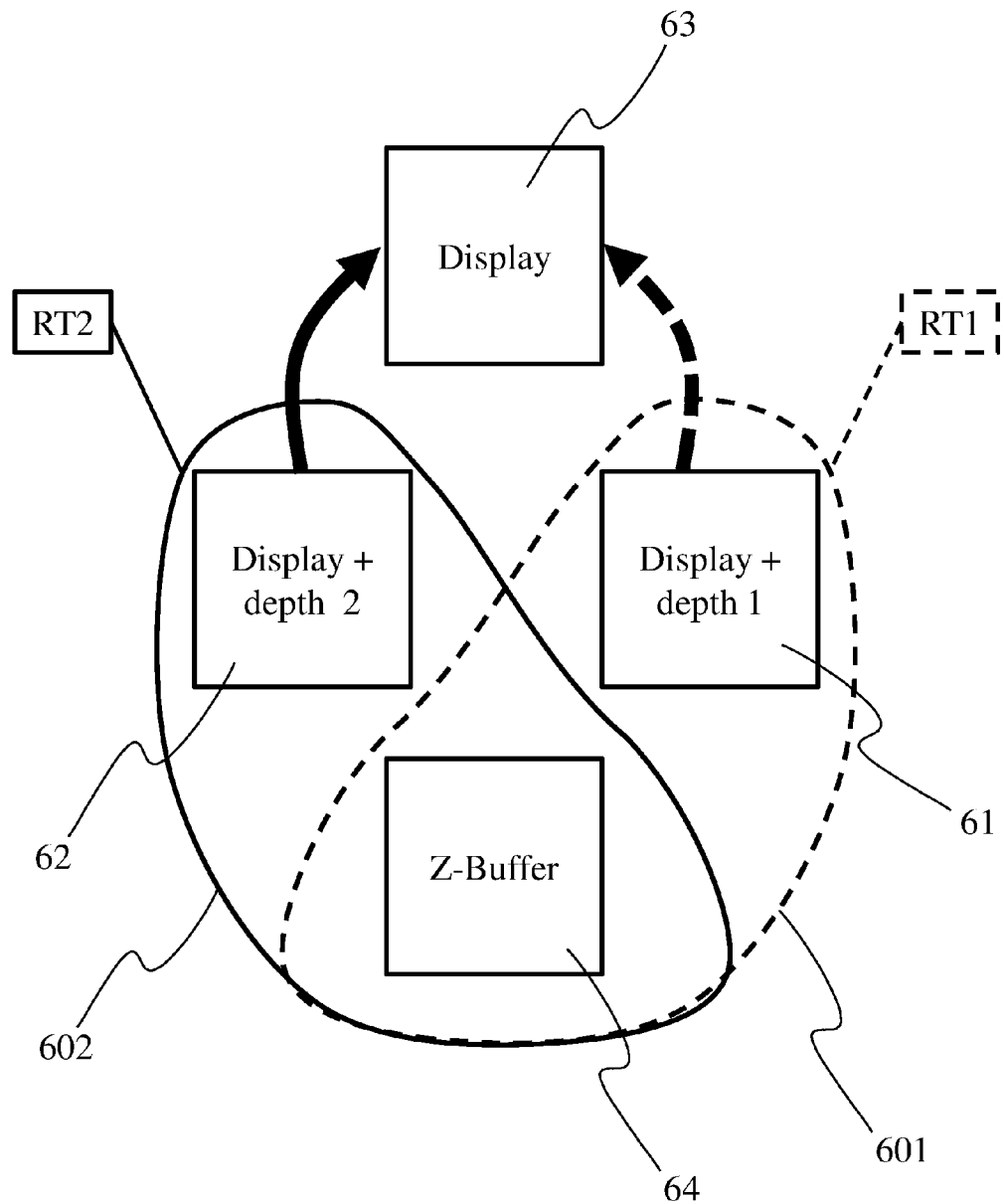
Figure 7:
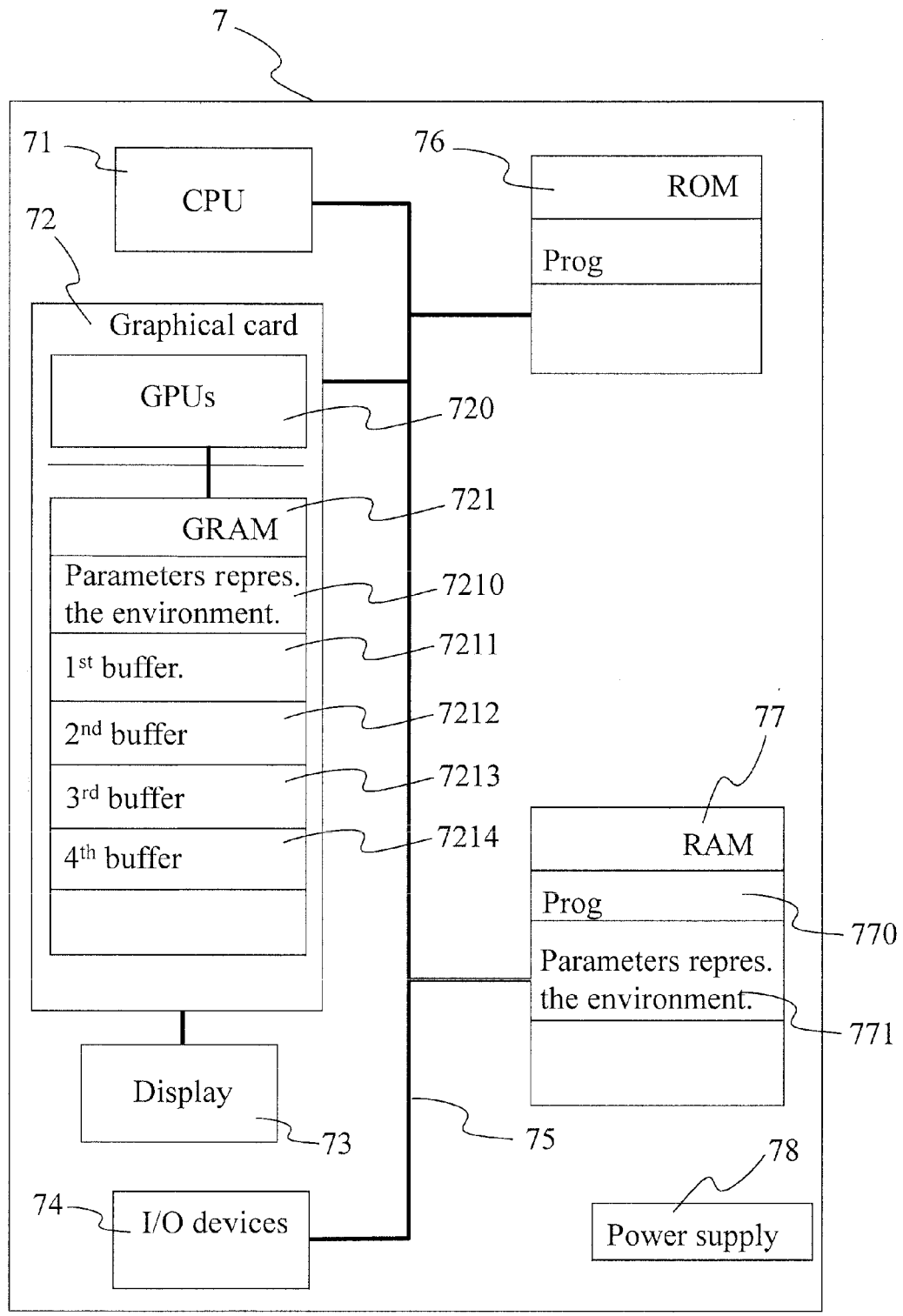
Figure 8:
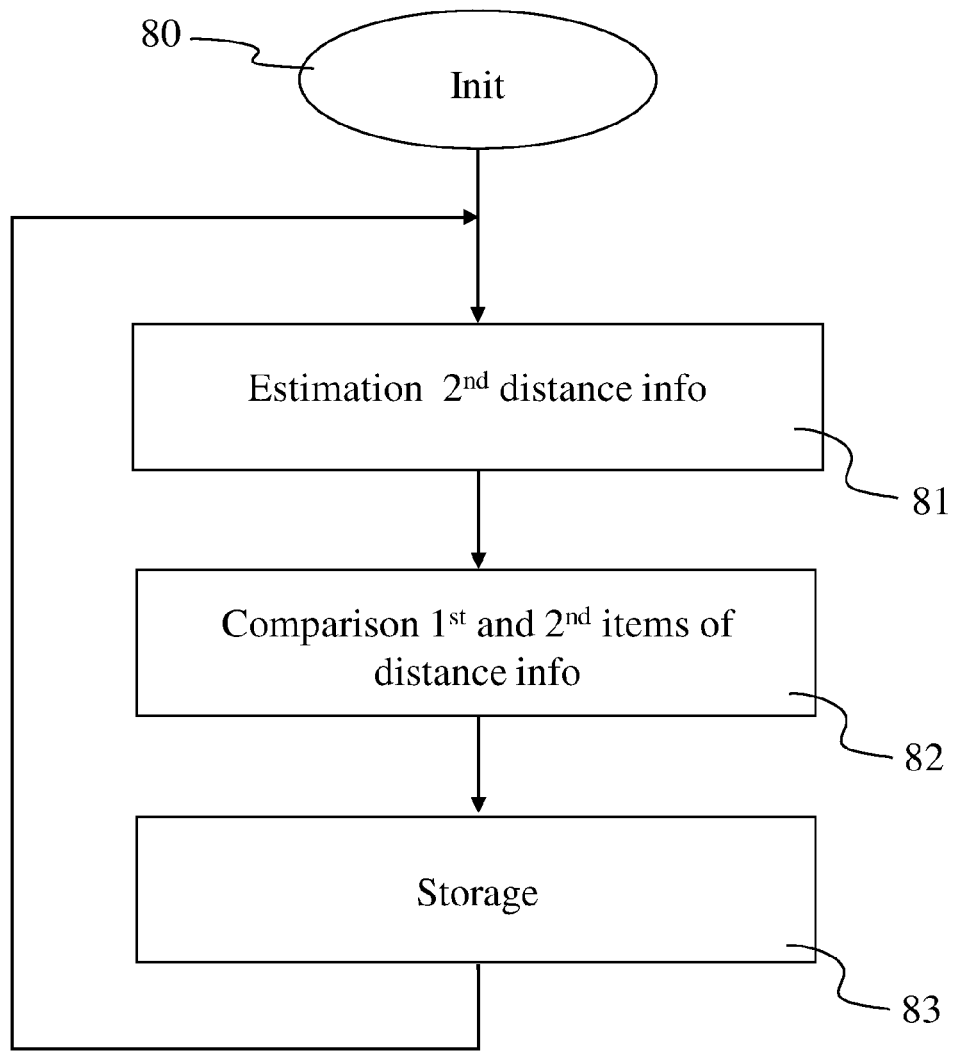
Figure 9:
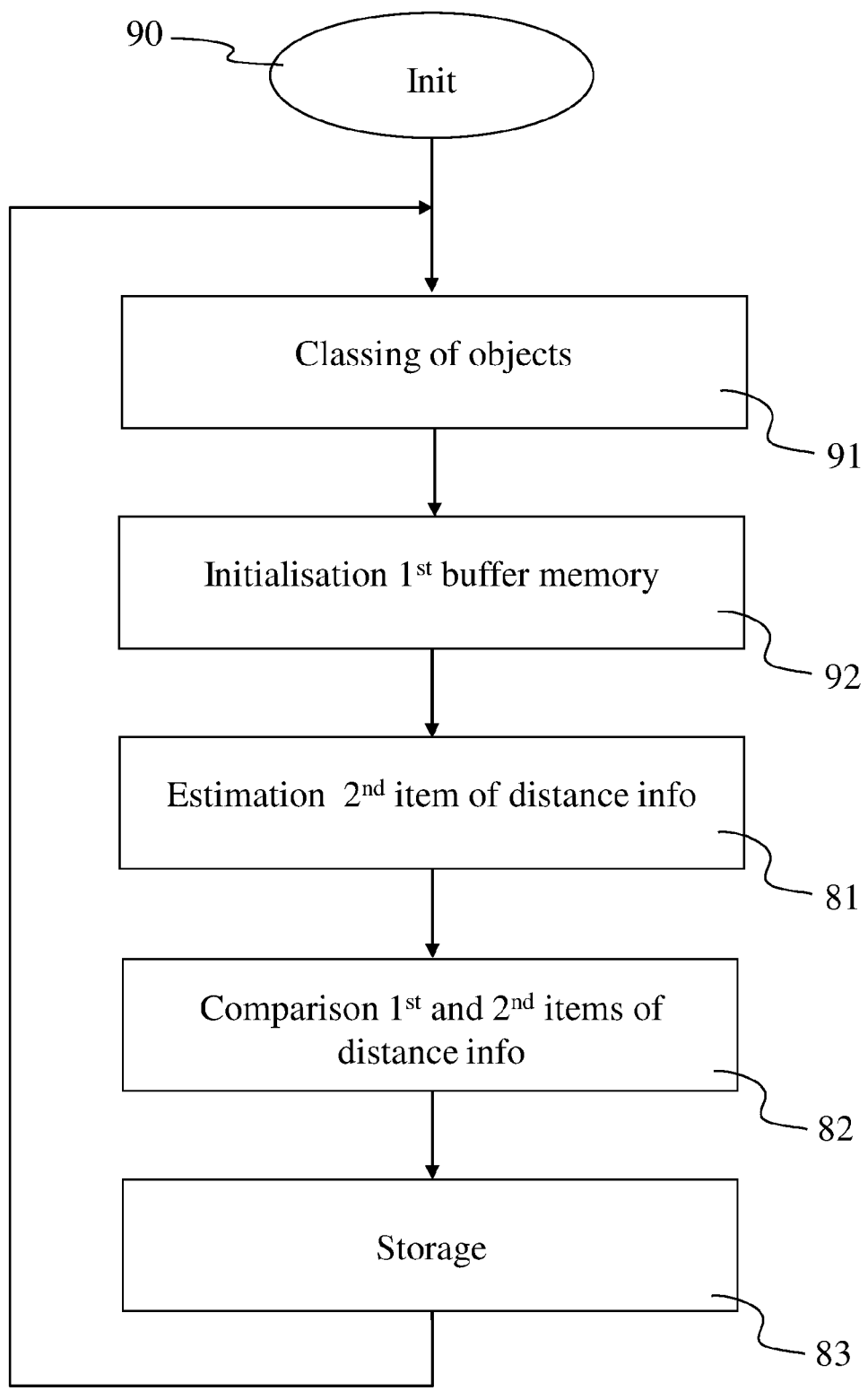

The invention will be better understood, and other specific features and advantages will emerge upon reading the following description, the description making reference to the annexed drawings wherein:

FIG. 1 diagrammatically shows a virtual environment as seen from a viewpoint, according to a particular embodiment of the invention, FIG. 2 shows an arrangement of buffer memories for the display of the virtual environment of FIG. 1, according to a particular embodiment of the invention, FIGS. 3, 4 and 5 diagrammatically show the management of buffer memories of FIG. 2 for the display of objects of the virtual environment of FIG. 1, according to a particular embodiment of the invention, FIG. 6 diagrammatically shows an arrangement of buffer memories for the display of the virtual environment of FIG. 1, according to another particular embodiment of the invention, FIG. 7 shows a device implementing a method for estimation of the occlusion in the virtual environment of FIG. 1, according to a particular implementation of the invention, FIGS. 8 and 9 show a method for estimation of the occlusion in the virtual environment of FIG. 1, according to two particular implementations of the invention.

5. DETAILED DESCRIPTION OF EMBODIMENTS OF THE INVENTION

FIG. 1 shows a virtual environment or a virtual scene (also called a 3D scene) 1 as seen from a viewpoint 10, for example a spectator of the virtual environment 1. The virtual environment 1 comprises several virtual objects 11, 12, 13 and 14, modelled according to any method known to those skilled in the art, for example by polygonal modelling, in which the model is assimilated with a set of polygons each defined by the list of summits and edges that compose it, by NURBS (Non uniform rational basic spline) type curve modelling in which the model is defined by a set of curves created via control vertices, by modelling by subdivision of surfaces. By virtual object is understood any virtual representation (obtained by modelling) of an object (real or fictitious) composing a real environment (for example the ground, a house or a house front, a car, a tree, that is to say any element composing an environment such as a part of a house, a street, a town, the countryside, etc.) or an imaginary element. Each object 11, 12, 13 and 14 of the virtual environment is characterized by a surface covering it, the surface of each object having reflectance properties (corresponding to the proportion of incident light reflected by the surface in one or several directions) that are specific to it. Advantageously, the reflectance of the surface of an object varies according to the zone of the object reflecting the light (a zone of the surface comprising one or several points of the surface) that is to say that the reflectance of the surface of an object is not constant. According to a variant, the reflectance of the surface of an object is constant at any point of the surface of the object. According to the example of FIG. 1, le spectator 10 looks at the point P1 110 of the surface of the object 11 according to an observation direction 100, the point P1 110 corresponding to the intersection between the observation direction 100 and the first object of the virtual environment 1 encountered via this observation direction having as an origin the viewpoint 10, namely the object 11. The part of the virtual environment 1 seen from the viewpoint 10 is represented by a viewing cone 101, the viewing cone being composed of a very great number of viewing directions including the viewing direction 100 and the viewing direction 102. The point P3 121 belonging to the surface of the object 12 corresponds to the first intersection between the viewing direction 102 and the first object encountered of the virtual environment 1 by this viewing direction 102, namely the object 12. By extending the observation direction 100, an intersection between this viewing direction and a second virtual object 12 is obtained, the intersection point being represented by the point P2 120. The distance separating the viewpoint 10 from the point P1 110, called depth of the point P1 with respect to the viewpoint 10, is less than the distance separating the viewpoint 10 from the point P2 120, called depth of the point P2 with respect to the viewpoint. The depth of P1 being less than that of P2, it is the point P1 that is visible via the viewpoint, the point P2 being occluded by P1. Thus, the attributes of the fragment of the surface of the object 11 associated with the point P1 are used to define the pixel of the image representing the virtual environment 1 seen via the observation direction 100 from the viewpoint 10. The point P3 121 not being occluded by a point of the object 11, the point P3 121 is visible from the viewpoint and the attributes of the fragment of the surface of the object 12 associated with the point P3 are used to define the pixel of the image representing the virtual environment 1 seen via the observation direction 102 from the viewpoint 10. A fragment becomes a pixel if the fragment is visible from the viewpoint. A fragment advantageously corresponds to a surface element associated with a point of the virtual environment 1 of the size of a pixel of the image that will be displayed to represent the virtual environment on a display screen. Advantageously the fragment is defined by a set of data grouping together one or several of the following data items:

the rasterization position of the fragment,
the depth of the fragment at the viewpoint,
attributes (for example the colour, the texture coordinates),
the alpha channel representative of the translucent character of the fragment.

The virtual environment 1 is advantageously lit by a luminous environment comprising one or several light sources (not shown).

FIG. 2 shows an arrangement of buffer memories 21, 22, 23 and 24 for the display of the virtual environment 1, according to a particular and non-restrictive embodiment of the invention. The buffer memories 21, 22, and 23 are advantageously of Render buffer type and the buffer memory 24 is advantageously of Z-buffer type. The render buffers and the z-buffer have the same structure and differ from each other through the data that they can contain. A z-buffer advantageously comprises information representative of depth, an item of depth information being associated with each pixel of the z-buffer. A render buffer advantageously comprises information representative of attributes associated with the pixels, an item of attributes information being associated with each pixel of the render buffer. The attributes of a pixel correspond for example to the component colours (for example RGB for "Red, Green, Blue") or to the component colours+transparency (that is to say RGBα). From four buffers 21 to 24 are defined two Render Targets RT1 201 and RT2 201. The first render target RT1 201 comprises the render buffer 21, called the first buffer memory, the render buffer 23, called the third buffer memory, and the z-buffer 24, called the fourth buffer memory. The second render target RT2 202 comprises the render buffer 22, called the second buffer memory, the render buffer 23, called the third buffer memory, and the z-buffer 24, called the fourth buffer memory. The first and second render targets RT1 and RT2 are used alternately for the display of objects of the virtual environment. The method enabling the objects composing the virtual environment to be displayed using render targets will be described in detail with respect to FIGS. 3 to 5. Advantageously, the first buffer memory 21 and the second buffer memory 22 are used to store items of depth information associated with the fragments of virtual objects 11 to 14 composing the virtual environment 1 in order to compare them. The third buffer memory 23 is used to store items of information representative of attributes associated with the pixels of the image representing the virtual environment 1. The fourth buffer memory 24 is used to store depth information associated with the pixels of the image representing the virtual environment 1.

The first, second, third and fourth buffer memories 21 to 24 are advantageously defined logically in the GRAM (Graphical Random Access Memory) associated with the GPUs (Graphics Processing Units) of a graphics card.

The first, second, third and fourth buffer memories 21 to 24 are advantageously of identical size and correspond to two-dimensional matrixes defined by m columns and n lines. Each buffer memory comprises for example m×n pixels, m and n being two integers. m and n advantageously correspond to the definition of the image representing the virtual environment (for example 1280×720 or 1920×1080). Each pixel of a buffer is defined by its column and line indexes, the pixels of same indexes in the four buffers 21 to 24 corresponding to a same pixel of the image.

According to a variant, the number of buffer memories is greater than 4. According to this variant, the arrangement comprises a single fourth z-buffer and single third render buffer, the number of buffers of render buffer type in which are stored item of depth information being greater than 2, for example the number of objects comprised in the virtual environment. According to this variant, there are also more than two render targets, the number of render targets being equal to the number of buffers of the type of the first and second buffers 21 and 22.

FIGS. 3 to 5 show the different steps enabling the display of the virtual environment 1 to be achieved using the buffer memories 21 to 24, according to a particular non-restrictive embodiment of the invention.

FIG. 3 shows the first step of a method enabling the display of objects, for example the objects 11, 12 and 13 of the virtual environment 1. During this first step, a first object is displayed, for example the object 11. The object 11 being the first object displayed of the scene, there is no occlusion to be taken into account and the totality of the object 11 as seen from the viewpoint 10 is displayed. To do this, the first render target RT1 201 is used. During the display of the first object 11, the depth of each of the fragments of the object 11 seen from the viewpoint 10 according to a viewing direction (for example the fragment associated with the point P110 according to the viewing direction 100) is stored in the first buffer 21. These depth values (that is to say the first items of information representative of the distance separating the viewpoint 10 of a first fragment from a first object, called first items of depth information) are represented by the zone 31 of the first buffer 21. This zone 31 corresponds to the first object 11 as seen from the viewpoint 10. The first object 11 corresponding to a sphere, the first zone 31 corresponds to a circle. The depth of each of the fragments of the object 11 is also stored in the fourth buffer 24, the depth values being represented by the zone 34 that is equivalent to the zone 31. During the display of the first object 11, the attributes associated with the fragments of the first object 11 seen from the viewpoint are stored in the third buffer. These attribute values (that is to say third items of information representative of attributes associated with the first fragments of the first object 11 seen from the viewpoint 10) are represented by the zone 33 of the third buffer 23. The zones 31, 34 and 33 each relate to a representation of the first object 11 as seen from the viewpoint 10, that is to say a circle, in each of the first 21, fourth 24 and third 23 buffers. During this first step, the second render target RT2 202 is not used and the first render target RT1 201 corresponds to the current render target.

FIG. 4 shows the second step of the method for displaying objects 11, 12 and 13 of the virtual environment 1. This second step relates to the display of the second object 12 of the virtual environment. The second render target RT2 202 becomes the current render target in the place of the first render target RT1. For each viewing direction of the viewing cone 101, it is estimated if there exists an intersection between the second object 12 and the viewing direction concerned. If this is the case, the distance separating the viewpoint 10 from the second object 12 is estimated, this distance corresponding to the depth of the fragment considered of the second object 12, called the second fragment, the depth associated with the second fragment being called the second item of depth information. For each fragment of the second object for which the depth is estimated, the depth value is compared with the depth value stored in the first buffer 21 for the corresponding fragment (that is to say for the first fragment of the first buffer having the same indexes m and n as the second fragment considered). Thus, if the second item of depth information associated with the second fragment considered is greater than the first item of depth information stored in the first buffer 21 for the fragment of the first corresponding buffer 21, then it is the first item of depth information that is stored in the second buffer 22. This case corresponds to the case of points P1 110 and P2 120 that correspond to a same pixel (that is to say they belong to a same viewing direction 100). According to this case, it is the first item of depth information corresponding to the depth P1 that is stored in the second buffer 22. If the second item of depth information associated with the second fragment considered is less than the first item of depth information stored in the first buffer 21 for the fragment of the first corresponding buffer 21, then it is the second item of depth information that is stored in the second buffer 22. This case corresponds to the case of the point P3 121 that is not occluded by the first object 11. The item of depth information associated with the fragment associated with P3 is compared to the item of depth information stored in the first buffer 21 for the corresponding fragment. No fragment of the first object being encountered by the viewing direction 102, the item of depth information stored in the first buffer 21 is for example a default value corresponding for example to the maximum depth of the virtual environment 1 or to a predefined value such as the biggest number that can be represented. When the depth of P3 is compared to this default value, then it is the item of depth information associated with P3 that is stored in the second buffer. Once all of the items of depth information associated with the second fragments of the second object have been compared with the corresponding pixels/fragments of the first buffer 21, a form representative of the form of the second object 12 (in this case a rectangle) is obtained in the second buffer for which the first part 42 contains depth values of second fragments (that is to say fragments of the second object 12 visible from the viewpoint 10) and for which a second part 41 contains depth values of first fragments (that is to say fragments of the first object 11 occluding fragments of the second object 12). The second items of depth information of the first part 42 are carried into the fourth buffer 24 that provides an overview of the virtual environment 1, that is to say it comprises depth information of fragments of the first and second objects closest to the viewpoint in their entirety. Only the attributes of second fragments visible from the viewpoint 10 (that is to say the second fragments for which the depth information is stored in the first part 42 of the second buffer 22) are estimated and stored in the third buffer 23 in the zone 43. The advantage of only calculating the attributes of second fragments after comparison of depths of these second fragments with the depths stored in the first buffer 21 is that this enables only attributes of second fragments to be calculated only for visible second fragments, which reduces the number of calculations required for the display of objects of the virtual environment.

FIG. 5 shows the third step of the method for displaying objects 11, 12 and 13 of the virtual environment 1. This third step relates to the display of the third object 13 of the virtual environment. The first render target RT1 201 becomes the current render target in the place of the second render target RT2. In the same way as in the second step, it is estimated if there is an intersection between the third object 13 and a set of viewing directions 100, 102 comprised in the viewing cone 101. If this is the case, an item of depth information is estimated and associated with each of the three fragments. Then, each item of depth information is compared to the depth information stored in the second buffer 22 for the corresponding fragment (that is to say for the pixel of the second buffer 22 for which the indexes m and n correspond to the indexes of the third pixel considered) as well as to the item of depth information stored in the first buffer for the fragment considered. Just like for the previous step, the smallest of these depth values is stored in the first buffer. An impression is obtained in the first buffer having as a form the form of the third object 13 for which a part comprises the depth values 31 associated with fragments of the first object 11 (when the first object 11 occludes both the second object 12 and the third object 13), depth values 52 associated with the second object (when the second object 12 is not occluded by the first object 11 but occludes the third object 13) and finally depth values 51 associated with fragments of the third object 13 (the fragments of the first object not occluded by the first object 11 or by the second object 12).

The items of depth information 51 associated with the third fragments of the third object 13 visible from the viewpoint 10 are copied into the fourth buffer 24. The fourth buffer 24 comprises the first items of depth information 34 associated with the first fragments of the first object 11 visible from the viewpoint 10, the second items of depth information 44 associated with the second fragments of the second object 12 visible from the viewpoint 10 and the items of depth information associated with the third fragments of the third object 13 visible from the viewpoint 10. The fourth buffer 24 contains an image of items of depth information fore the entire virtual environment 1 seen from the viewpoint 10 while the first 21 and second 22 buffers only contain one view linked to an object and to the associated occlusions, that is to say that the first and second buffers comprise an impression of an object with the associated items of occlusion information (which fragments of the object are visible and which fragments are occluded).

The third buffer 23 is updated with the information representative of attributes for the fragments of the third object 13 visible from the viewpoint 10, that is to say for the fragments of the third object for which the items of depth information 51 are stored in the first buffer. Comparing the depth of fragments of the third object before estimating the associated attributes offers the advantage of limiting the calculations required for the display of the image by only doing the calculations for the visible fragments rather than for all of the fragments. The use of the fourth buffer 24 offers the advantage of having a vision consistent with the virtual environment 1 by storing the items of depth information for all the objects and enables compatibility with the display methods only using one z-buffer and one render buffer to be assured.

According to a variant, the third object is displayed in a render type buffer of the same type as the first buffer 21 or the second buffer 22 but different from the first buffer 21 and the second buffer 22. According to this variant, the third object is displayed in a third render target (not shown) formed of the additional buffer of the same type as the first and second buffers, of the third buffer 23 and the fourth buffer 24. This variant has the advantage of enabling the display of several objects in parallel. In fact, as it is not possible to read in a buffer in which the data are being written, it is possible according to this variant the write the data (for example items of depth information) simultaneously in two buffers (for example the additional buffer and the second buffer 22), the comparison of depths being made between the additional buffer and the buffer in which no writing is ongoing (the first buffer 21 according to the example). According to this variant, there are three render targets, the third render target comprising the additional buffer (of the same type as the first and second buffers 21 and 22), the third buffer 21 and the fourth buffer 24. According to this variant, the first object is for example displayed via the first render target. Once the writing is completed in the first buffer 21, that is to say once the first object 11 has been displayed, the second object 12 and the third object 13 are displayed simultaneously via respectively the second render target RT2 and the third render target. The items of depth information of the second object 12 are compared to the information contained in the first buffer 21 before writing in the second buffer 22 and the items of depth information of the third object 13 are themselves also compared to the items of information contained in the first buffer 21 before writing in the additional buffer. The third object 13 is thus not compared to the second object before its display in the additional buffer. The account taken of occlusions linked to the first object for the display of the third object will be taken into account during the display in the third buffer by verifying the occlusions (that is to say the items of depth information) that are by default always stored in the fourth buffer that correspond to the z-buffer storing all the items of depth information of each of the objects, only the smallest items of depth information being stored. Coherency at the level of occlusions over the entire scene is thus assured. The simultaneous display of several objects obtained via this variant offers the advantage of further accelerating processing. According to another variant, there are as many render targets as there are objects existing in the virtual environment, which means that there are as many buffers of the type of the first and second buffers 21 and 22 as there are objects existing in the virtual environment. According to this variant, the coherency of the display of the virtual environment, that is to say the account taken of all the occlusions existing in the virtual environment is assured via the fourth buffer that comprises coherent items of depth information for all the objects of the virtual environment.

FIG. 6 shows an arrangement of buffer memories 21, 22, 23 and 24 for the display of the virtual environment 1, according to another particular and non-restrictive embodiment of the invention. The buffer memories 61, 62, 63 and 64 are similar to the memories 21, 22, 23 and 24 described with respect to FIG. 2 in the sense that the buffers 61, 62 and 63 are of render buffer type and the buffer 64 is of z-buffer type. The third buffer 63 is similar to the third buffer 23 of FIG. 2 in the sense that the third buffer 63 is also used to store items of information representative of attributes of pixels of the image representing the virtual environment 1. The fourth buffer 64 is similar to the fourth buffer 24 of FIG. 2 in the sense that the fourth buffer 64 is also used to store items of depth information associated with the pixels of the image representing the virtual environment 1. A difference between the first and second buffers 61 and 62 and the first and second buffers 21 and 22 of FIG. 2 is that the first and second buffers 61 and 62 are used to store items of information representative of attributes of objects of the virtual environment, for example RGBα, the channel alpha α being used to store the depth information associated with these fragments. The arrangement of buffer memories of FIG. 6 comprises two render targets, namely a first render target RT1 601 and a second render target RT2 602. The first render target RT1 comprises the first buffer 61 and the fourth buffer 64. The second render target RT2 comprises the second buffer 62 and the fourth buffer 64. In a first step, the first render target RT1 is the current target for example and the first object 11 is displayed. The depth of each of the fragments of the object 11 viewed from the viewpoint 10 according to a viewing direction is stored in the first buffer 61 as well as the attributes associated with these fragments. In a second step, the second render target RT2 becomes the current target in the place of the first render target RT1. During this second step, a second object 12 is displayed. To do this, the depth of each of the fragments of the second object is estimated and compared to the information stored in the first buffer 61 for the corresponding fragment (that is to say having the same indexes m and n). If the second item of depth information associated with the second fragment has a value greater than that of the first item of information stored in the first buffer 61, then only the second item of depth information is stored in the second buffer 62, for example in the alpha channel, without estimating the attributes associated with the second fragment. However, if the second item of depth information associated with the second fragment has a value less than that of the first item of information stored in the first buffer 61, then the second item of depth information is stored in the second buffer 62 and the attributes associated with the second fragment are calculated and stored in the second buffer, for example in the RGB channel, the depth being stored in the associated alpha channel. These steps are reiterated for all the objects of the virtual environment alternating the render targets as current target. Then in a final step, the contents of the first and second buffers 61 and 62 are compared before the third buffer is updated (the render buffer serving the display of the image) 63. In order to update the third buffer 63, the items of depth information contained in the pixels corresponding to each of the first and second buffers are compared 2 by 2. The information representative of attributes associated with the fragment having the smallest depth value (pixel of the first buffer 61 or pixel corresponding to the second buffer 62) is copied into the third buffer. According to this embodiment, the access to the third buffer is only done once for a given pixel which enables the requirements in bandwidth to be limited. According to this embodiment, when the second item of depth information associated with the second fragment (stored in the second buffer) is less than the first item of depth information associated with the first fragment (stored in the first buffer), it is the third item of information representative of attributes associated with the second fragment that is copied into the third buffer. Otherwise, when the second item of depth information associated with the second fragment (stored in the second buffer) is greater than the first item of depth information associated with the first fragment (stored in the first buffer), it is the fourth item of information representative of attributes associated with the first fragment that is copied into the third buffer. According to this embodiment, the third item of information and/or the fourth item of information are stored temporarily in respectively the second buffer 62 and the first buffer 61 before being copied into the third buffer 63.

FIG. 7 diagrammatically shows a hardware embodiment of a device 7 adapted for the estimation of the occlusion in a virtual environment 1 and of the creation of display signals of one or several images, according to a particular and non-restrictive embodiment of the invention. The device 7 corresponding for example to a personal computer PC, a laptop or a games console.

The device 7 comprises the following elements, connected to each other by a bus 75 of addresses and data that also transports a clock signal:
- a microprocessor 71 (or CPU),
- a graphics card 72 comprising:
    - several Graphical Processor Units (or GPUs) 720,
    - a Graphical Random Access Memory (GRAM) 721,
- a non-volatile memory of ROM (Read Only Memory) type 76,
- a Random Access Memory or RAM 77,
- one or several I/O (Input/Output) devices 74 such as for example a keyboard, a mouse, a webcam, and
- a power source 78.

The device 7 also comprises a display device 73 of display screen type directly connected to the graphics card 72 to display notably the display of synthesized images calculated and composed in the graphics card, for example live. The use of a dedicated bus to connect the display device 73 to the graphics card 72 offers the advantage of having much greater data transmission bitrates and thus reducing the latency time for the displaying of images composed by the graphics card. According to a variant, a display device is external to the device 6 and is connected to the device 7 by a cable transmitting the display signals. The device 7, for example the graphics card 72, comprises a means for transmission or connection (not shown in FIG. 7) adapted to transmit a display signal to an external display means such as for example an LCD or plasma screen or a video-projector.

It is noted that the word "register" used in the description of memories 72, 76 and 77 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 71 loads and executes the instructions of the program contained in the RAM 77.

The random access memory 77 notably comprises:
in a register 770, the operating program of the microprocessor 71 responsible for switching on the device 7,
parameters 771 representative of the virtual environment 1 (for example modelling parameters of the virtual environment 1, lighting parameters of the virtual environment 1).

The algorithms implementing the steps of the method specific to the invention and described hereafter are stored in the memory GRAM 721 of the graphics card 72 associated with the device 7 implementing these steps. When switched on and once the parameters 770 representative of the environment are loaded into the RAM 77, the graphic processors 720 of the graphics card 72 load these parameters into the GRAM 721 and execute the instructions of these algorithms in the form of microprograms of "shader" type using HLSL (High Level Shader Language) language or GLSL (OpenGL Shading Language) for example.

The random access memory GRAM 721 notably comprises:
in a register 7210, the parameters representative of the virtual environment 1,
first items of information 7211 representative of the depth of fragments visible from one or several objects of the virtual environment 1 visible from a viewpoint 10,
second items of information 7212 representative of the depth of fragments visible from one or several objects of the virtual environment 1 visible from a viewpoint 10,
third items of information 7213 representative of attributes of pixels of the image representative of the virtual environment 1 as seen from the viewpoint 10, and
fourth items of information 7214 representative of the depth of pixels of the image representative of the virtual environment 1 as seen from the viewpoint 10.

According to a variant, a part of the RAM 77 is assigned by the CPU 71 for storage of the values 7211 to 7214 if the memory storage space available in GRAM 721 is insufficient. This variant however causes greater latency time in the composition of an image comprising a representation of the environment 1 composed from microprograms contained in the GPUs as the data must be transmitted from the graphics card to the random access memory 77 passing by the bus 75 for which the transmission capacities are generally inferior to those available in the graphics card for transmission of data from the GPUs to the GRAM and vice-versa.

According to another variant, the power supply 78 is external to the device 4.

Advantageously, the buffers comprising the first items of information 7211 and the second items of information 7212 are defined differently logically.

The allocation of memory space of the GRAM used by the buffer memories 21 to 24 is implemented via the pilot of the GPU(s) for example via the intermediary of an API (Application Program Interface).

FIG. 8 shows a method for estimation of the occlusion in a virtual environment implemented in a device 7, according to a first non-restrictive particularly advantageous embodiment of the invention.

During an initialisation step 80, the different parameters of the device 7 are updated. In particular, the parameters representative of the virtual environment 1 are initialised in any way.

Then, during a step 81, a second item of information representative of the distance separating a second fragment 120, 121 from a first object 12 from a viewpoint 10 according to an observation direction 100,102 is estimated. The distance separating the second fragment from the viewpoint 10 corresponds to the depth of the second fragment and is estimated for example by projection of the second object into the camera space or by estimation of an Euclidean distance.

Then, during a step 82, the second item of information estimated during step 81 is compared to a first item of information representative of a distance separating a first fragment 110 belonging to a first object 11 from the viewpoint 10 according to the viewing direction 100. This first item of information is advantageously stored in a first buffer memory 21, 61.

Finally, during a step 83, a second buffer memory 22 is updated according to the result of the comparison implemented in step 82. If the depth value corresponding to the second item of information estimated in step 81 is less than the depth value corresponding to the first item of information, then a third item of information representative of attributes associated with the second fragment of the second object 12 for which the second item of depth information was estimated is determined. The second item of information is stored in the second buffer memory 22 and the third item of information is stored in a third buffer memory 23 that advantageously comprises the attributes of pixels of the image representing the virtual environment 1 as seen from the viewpoint 10. If the depth value corresponding to the second item of information estimated in step 81 is greater than the depth value corresponding to the first item of information, then it is the first item of information that is stored in the second buffer memory 22, the estimation of attributes associated with the second fragment not being implemented as the second fragment is not visible from the viewpoint 10, as it is occluded by a first fragment of the first object. According to an advantageous variant, the information having the smallest value from among the first item of information and the second item of information is recorded in a fourth buffer memory, advantageously of z-buffer type.

Advantageously, the first buffer memory 21, the second buffer memory 22 and the third buffer memory 23 are of render buffer type.

The steps 81, 82 and 83 are advantageously reiterated for each second fragment of the second object 12, that is to say according to several viewing directions. The steps 81, 82 and 83 are advantageously reiterated until all the objects of the virtual environment 1 have been taken into account. According to a variant, the steps 81, 82 and 83 are reiterated when the viewpoint changes.

FIG. 9 shows a method for estimation of the occlusion in a virtual environment 1 implemented in a device 7, according to a second non-restrictive embodiment of the invention.

During an initialisation step 90, the different parameters of the device 7 are updated. In particular, the parameters representative of the virtual environment 1 are initialised in any way.

Then, during a step 91, the objects 11 to 14 of the virtual environment are classed according to their respective distance from the viewpoint, from the closest to the viewpoint to the furthest from the viewpoint.

Then, during a step 92, the first buffer memory 21, 61 is initialised with items of information representative of the distance separating each first fragment from the first object 11, the first object being the object classed as being closest to the viewpoint. According to a variant, the classing step is optional and the first buffer memory is initialised with the items of depth information of an object selected randomly from among the objects composing the virtual environment. For the fragments of the first buffer memory to which there is no corresponding first fragment of the first object, that is to say for the fragments of the first buffer memory for which there is no depth information, a default value is given, for example the maximum depth of the virtual environment 1 or a predefined value.

Then, during a step 81 identical to that described with respect to FIG. 8, a second item of information representative of the depth of a second fragment of a second object 12 is estimated.

Then, during a step 82 identical to that described with respect to FIG. 8, the second estimated item of depth information is compared to the first item of depth information stored in the first item of depth information, whether this first item of depth information corresponds to a depth of a first fragment or to a default value.

Then, during a step 83 identical to that described with respect to FIG. 8, the second buffer memory 22, 62 and the third buffer memory 23, 63 are updated according to the comparison result.

Naturally, the invention is not limited to the embodiments previously described.

In particular, the invention is not limited to a method for estimation of the occlusion in a virtual environment but also extends to any device implementing this method and notably any devices comprising at least one GPU. The implementation of calculations necessary to the estimation of the occlusion is not limited either to an implementation in shader type microprograms but also extends to an implementation in any program type, for example programs that can be executed by a CPU type microprocessor.

The number of objects composing the virtual environment is not restricted to 2, 3 or 4 but extends to any number of objects.

The use of the invention is not limited to a live utilisation but also extends to any other utilisation, for example for processing known as postproduction processing in a recording studio for the display of synthesis images for example. The implementation of the invention in postproduction offers the advantage of providing an excellent visual display in terms of realism notably while reducing the required calculation time.

The invention also relates to a method for composition or generation of a video image, in two dimensions or in three dimensions, for which the occlusion according to one or several observation directions is calculated and the information representative of the attribute of fragments that results is used for the displaying of pixels of the image, each pixel corresponding to an observation direction. The occlusion determined for displaying by each of the pixels of the image is re-calculated to adapt to the different viewpoints of the spectator.

The present invention can be used in video game applications for example, whether via programs that can be executed in a PC or portable type computer or in specialised game consoles producing and displaying images live. The device 7 described with respect to FIG. 7 is advantageously equipped with interaction means such as a keyboard and/or joystick, other modes for introduction of commands such as for example vocal recognition being also possible.

The invention claimed is:

1. A method for generating an image representative of a virtual environment comprising at least three objects, the virtual environment being observed from a viewpoint, said method comprising:
    defining a first render target and a second render target, wherein a first buffer memory refers to one of the first and second render targets, and a second buffer memory refers to the render target which is not referred to by the first buffer memory;
    performing a rendering pass for each object using a computer processor, wherein each rendering pass for a current object following rendering passes for first and second objects comprises:
    computing a third item of information representative of the distance separating a third fragment of a current object from said viewpoint according to an observation direction;
    comparing said third item of information with a first item of information representative of the distance separating a first fragment of a previous object from said viewpoint according to said observation direction, said first item of information being stored in the first buffer memory;
    comparing said third item of information with a second item of information representative of the distance separating a second fragment of a previous object from said viewpoint according to said observation direction, said second item of information being stored in the second buffer memory;
    storing the smallest of the first, second and third items of information in the second buffer memory;
    when and only when the third item of information is less than the first item of information and the third item of information is less than the second item of information, computing a fourth item of information representative of attributes associated with the third fragment and storing the fourth item of information in a third buffer memory holding the generated image, and
    after each rendering pass is completed, the first buffer memory and the second buffer memory are alternated such that the first buffer memory in the subsequent rendering pass refers to the render target referred to by the second buffer memory in the completed rendering pass, and the second buffer memory in the subsequent rendering pass refers to the render target referred to by the first buffer memory in the completed rendering pass.

2. The method according to claim 1, wherein the first, second and third buffer memories are memories of render buffer type of a graphic processor.

3. The method according to claim 1, wherein the item of information having the smallest value from among the first item of information and third item of information is stored in a fourth buffer memory.

4. The method according to claim 1, wherein the fourth item of information is stored temporarily in the second buffer memory before being copied into the third buffer memory.

5. The method according to claim 1, wherein when the third item of information is greater than the first item of information, a fifth item of information representative of attributes associated with the first fragment is stored in the third buffer memory.

6. The method according to claim 5, wherein the fifth item of information is stored temporarily in the first buffer memory before being copied into the third buffer memory.

7. The method according to claim 1, wherein the computing, comparing and storing are reiterated for each third fragment of the current object.

8. The method according to claim 1, further comprising classifying the at least three objects of said virtual environment according to their respective distances to the viewpoint, from the closest to the viewpoint to the farthest from the viewpoint, the first object being closer to the viewpoint than the second object.

9. The method according to claim 1, further comprising initializing the first buffer memory with information representative of the distance separating each fragment of the first object from the viewpoint.

10. A device configured to generate an image representative of a virtual environment comprising at least three objects, the virtual environment being observed from a viewpoint, wherein said device comprises at least a processor configured to:
    define a first render target and a second render target, wherein a first buffer memory refers to one of the first and second render targets, and a second buffer memory refers to the render target which is not referred to by the first buffer memory;
    perform a rendering pass for each object, wherein for each rendering pass for a current object following rendering passes for the first and second objects, the processor is further configured to:
    compute a third item of information representative of the distance separating a third fragment of a third object from said viewpoint according to an observation direction,
    compare said third item of information with a first item of information representative of the distance separating a first fragment of a previous object from said viewpoint according to said observation direction, said first item of information being stored in the first buffer memory;
    compare said third item of information with a second item of information representative of the distance separating a second fragment of a previous object from said viewpoint according to said observation direction, said second item of information being stored in the second buffer memory;
    store the smallest of the first, second and third items of information in the second buffer memory;
    when and only when the third item of information is less than the first item of information, and the third item of information is less than the second item of information, compute a fourth item of information representative of attributes associated with the third fragment, store the fourth item of information in a third buffer memory holding the generated image; and
    after each rendering pass is completed, the first buffer memory and the second buffer memory are alternated such that the first buffer memory in the subsequent rendering pass refers to the render target referred to by the second buffer memory in the completed rendering pass, and the second buffer memory in the subsequent rendering pass refers to the render target referred to by the first buffer memory in the completed rendering pass.

11. The device according to claim 10, wherein the first, second and third buffer memories are memories of render buffer type of a graphical processor unit.

12. The device according to claim 10, further comprising a fourth buffer memory to store information having the smallest value from among the first item of information and third item of information.

13. A non-transitory computer readable medium comprising instructions of program code for executing the method according to claim 1, when said program is executed on a computer.

14. The device according to claim 10, wherein the processor is further configured to temporarily store the fourth item of information in the second buffer memory before being copied into the third buffer memory.

15. The device according to claim 10, wherein when the third item of information is greater than the first item of information, the processor is further configured to store in the third buffer memory a fifth item of information representative of attributes associated with the first fragment.

16. The device according to claim 15, wherein the processor is further configured to temporarily store the fifth item of information in the first buffer memory before being copied into the third buffer memory.

17. The device according to claim 10, wherein the processor is further configured to reiterate the computing, comparing and storing for each third fragment of the current object.

18. The device according to claim 10, wherein the processor is further configured to classify the at least three objects of said virtual environment according to their respective distances to the viewpoint, from the closest to the viewpoint to the farthest from the viewpoint, the first object being closer to the viewpoint than the second object.

19. The device according to claim 1, wherein the processor is further configured to initialize the first buffer memory with information representative of the distance separating each fragment of the first object from the viewpoint.

* * * * *